(12) United States Patent
Sarma et al.

(10) Patent No.: US 6,988,264 B2
(45) Date of Patent: Jan. 17, 2006

(54) DEBUGGING MULTIPLE THREADS OR PROCESSES

(75) Inventors: Dipankar Sarma, Bangalore (IN); Srivatsa Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 10/102,387

(22) Filed: Mar. 18, 2002

(65) Prior Publication Data

US 2003/0177476 A1 Sep. 18, 2003

(51) Int. Cl.
*G06F 9/44* (2006.01)

(52) U.S. Cl. .................. 717/128; 717/127; 717/129; 718/100

(58) Field of Classification Search ............. 717/124, 717/128, 127, 129; 718/100
See application file for complete search history.

(56) References Cited

U.S. PATENT DOCUMENTS

| 5,526,485 | A | * | 6/1996 | Brodsky | 714/38 |
| 5,632,032 | A | * | 5/1997 | Ault et al. | 718/100 |
| 6,167,536 | A | * | 12/2000 | Mann | 714/45 |
| 6,324,683 | B1 | * | 11/2001 | Fuh et al. | 717/124 |
| 6,412,106 | B1 | * | 6/2002 | Leask et al. | 717/124 |
| 6,516,460 | B1 | * | 2/2003 | Merks et al. | 717/124 |

* cited by examiner

*Primary Examiner*—Meng-Al T. An
*Assistant Examiner*—Li Zhen
(74) *Attorney, Agent, or Firm*—Anthony V S England; T. Rao Coca

(57) ABSTRACT

Debugging multiple tasks, using a single instance of a debugger application intended to be only capable of debugging a single task, is performed by intercepting system calls made by the debugger application to the operating system. The intercepted system calls are directed to an appropriate task, which is one amongst the multiple tasks to be debugged.

13 Claims, 21 Drawing Sheets

DEBUGGING MULTIPLE THREADS OR PROCESSES

FIELD OF THE INVENTION

The present invention relates to debugging and relates particularly but not exclusively to debugging multiple threads or processes collectively referred to herein as tasks.

BACKGROUND

Debuggers are software tools used to debug software program execution. User space debuggers assist in debugging user-written programs that run in a user space, in contrast to kernel debuggers that aid in debugging a kernel or operating system. Kernel debuggers are typically used by developers of system software such as kernel modules, device drivers etc, while user space debuggers are typically used by application developers.

Some common examples of user-space debuggers are: gdb (on the Linux operating system) and dbx (on the AIX™ operating system).

This invention applies to most user-space debuggers. A possible extension of this invention to kernel space debuggers is discussed. The term usdb is used in this document to denote a generic user-space debugger.

FIG. 1 schematically represents the interaction of usdb 10 and an application program 20 being debugged (denoted TA, for convenience). A single instance of usdb acts directly on a single instance of the application program (TA) being debugged.

The usdb debugger provides an interactive menu for the debugger to control execution of the debugee application (TA). The debugger provides commands for "single-stepping", applying "breakpoints", dumping "memory" contents etc. usdb normally makes use of operating system services such as ptrace to provide these commands. Using these basic commands, the debugger is able to control/analyze program execution. usdb typically uses the wait system call to get notified when the debugee stops because of a debug event (breakpoint, signals etc).

ptrace is a system call available on most flavors or variants of the Unix operating system (such as Linux or AIX™). ptrace is used normally by debuggers to control program execution. ptrace normally provides the following services listed directly below:
1. Attach (PTRACE_ATTACH)—This service is used to "attach" to a target process.
2. Get registers (PTRACE_GETREGS)—This service obtains registers values of the target process.
3. Set registers (PTRACE_SETREGS)—This service modifies registers values of the target process.
4. Continue (PTRACE_CONT)—This service continues a stopped process. The process runs until the process hits a debug event (such as breakpoint) that causes the process to stop again.
5. View memory (PTRACE_PEEKTEXT)—This service examines the memory contents of the target process.
6. Modify memory (PTRACE_POKETEXT)—This service modifies the contents of target process memory.

FIG. 2 shows three programs that are running at the same time in a machine. These three concurrently executing tasks are referred to for convenience as TA, TB and TC. Respective "copies" of usdb 10, 30, 50 are used for each task. As with the case of a single task 20 (TA, as represented in FIG. 1), each instance of usdb acts directly on a respective process 20, 40, 60 (TA, TB or TC, as represented in FIG. 2).

FIG. 3 schematically represents another possibility for simultaneously controlling multiple programs. In this case, one instance of usdb 10 controls tasks 20, 20', 20" (TA, TB and TC) simultaneously. The approach conveniently provides a single point of control for TA, TB and TC. This approach can be desirable when the multiple programs are related and the debugger wishes to control/debug all of the programs from a single point of control.

This integrated approach is possible only when TA, TB and TC are "closely" related to each other. This close relation is possible when these tasks have a parent-child relationship. Further, Unix (and other) operating systems use the concept of "threads" to define such a close association. Threads belonging to the same process have many things in common, such as address space, signal handlers etc. If so, usdb detects threads created by the debugee application/process and can use this information to control all threads simultaneously. usdb can support threading and if so, maintains knowledge about each individual thread (such as thread ID etc.). Without such support and knowledge, usdb cannot control TA, TB and TC simultaneously.

In view of the above, a need clearly exists for an improved manner of debugging applications that at least attempts to address one or more prior art limitations.

SUMMARY

A single instance of a debugger application can be used in a multiple task execution context for a debugger that assumes the existence of only one task. A "switch" mechanism is used to perform a "context switch" between different tasks to simultaneously debug the multiple tasks. This context switch is transparent to the debugger (usdb).

The above described "context switch" involves intercepting debug-related system calls being made by usdb, and suitably manipulating the system call arguments. Further, the debugger is activated using a "false wakeup" process.

DETAILED DESCRIPTION

Figure 1:
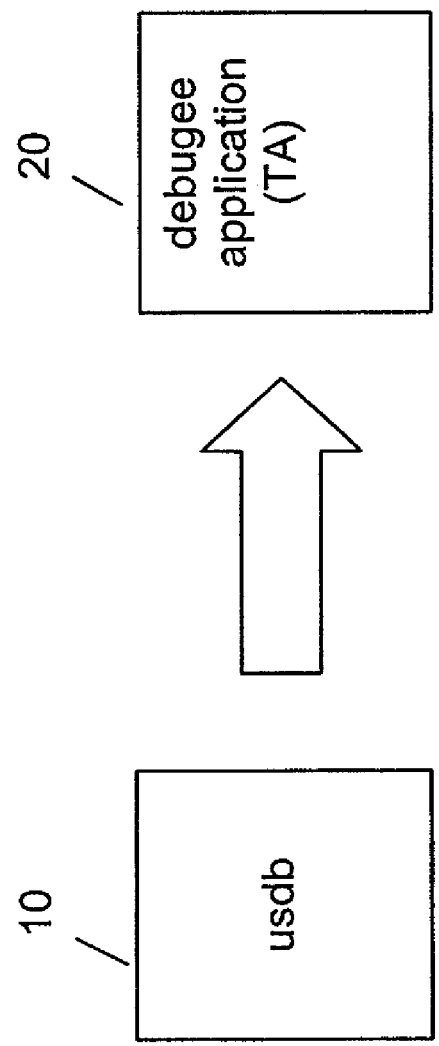
FIG. 1 is a schematic representation of the interaction of the usdb debugger application and an application program being debugged (denoted TA, for convenience).
Figure 2:
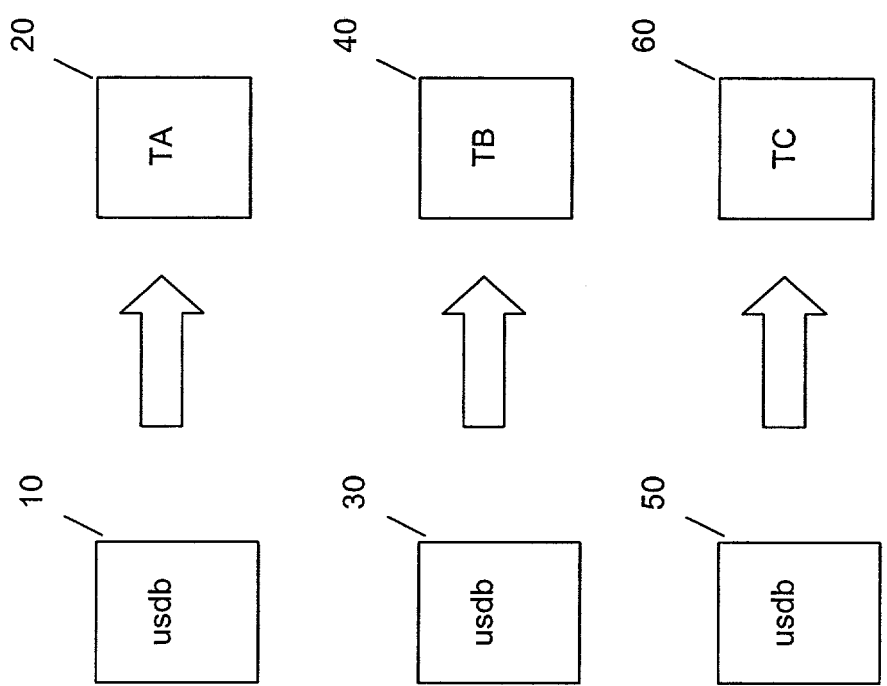
FIG. 2 is a schematic representation of a process for debugging different tasks, in which three separate "instances" of usdb, running simultaneously, each control a different respective process.

The described techniques are illustrated in the context of debuggers for user-space applications. However, the described techniques are more also generally applicable to other debuggers such as kernel debuggers, as described below.

Acronyms and Terms

Acronyms/terms used herein are listed below:

CPU: central processing unit.

Debugee: a program being debugged.

Debugger: tool used to debug program execution, or a person who uses such a tool is using the debug tool. The context in which this term is used indicates which meaning is intended.

gdb: typical user-space debugger available on Linux.

Kdb: typical kernel-space debugger available on Linux.

Kgdb: another typical kernel-space debugger available on Linux.

Linux: Unix-like operating system.

OS: operating system.

PID: process ID.

Ptrace: a system call available on most Unix systems, typically used by debuggers to control the debugee process.

RAM: random access memory.

SMP: symmetric multi-processing. A type of coupling which allows multiple processors to work as one unit.

Task: process or threads.

TA, TB, TC: tasks

TID: Task ID

Processes and Threads

A process is an instance of a program running in a computer. In Unix and some other operating systems, a process is started when a program is initiated (either by a user entering a shell command or by another program). A process is a running program with which a particular set of data is associated so that the process can be tracked. An application that is being shared by multiple users generally has one process at some stage of execution for each user.

A thread is an independent sequence of execution of program code inside a process. Threads are often called lightweight processes but are note actual processes. A thread essentially comprises a program counter, stack and a set of registers.

The fundamental difference between a process and a thread is that a process has an entire copy of the underlying program to itself, and thus consumes a relatively large amount of memory in contrast to a thread. A thread is simply a separate execution context within a single process: each thread shares all allocated memory with other threads, with the exception of just a small amount of per-thread memory so that the operating system can keep track of the execution context of each thread.

One way thread information is retained is by storing the thread information in a special data area and putting the address of that data area in a register. The operating system saves the contents of the register when the program is interrupted and restores the contents when the operating system gives the program control again.

The term "task" is used herein to represent both a thread and a process. In this sense, threads are essentially multiple tasks that share the same set of resources such as address space, signal handlers etc. Multiple tasks that do not share resources such as address space can be considered to be processes.

Switching Approach

Existing debuggers do not support multiple tasks or only support multiple tasks that either belong to the same process or have a parent-child relationship. The techniques described herein allow a single instance of usdb to work with multiple tasks. These multiple tasks neither need belong to the same process nor have a parent-child relationship. No modification to the usdb program itself is required to process such multiple threads.

Figure 3:
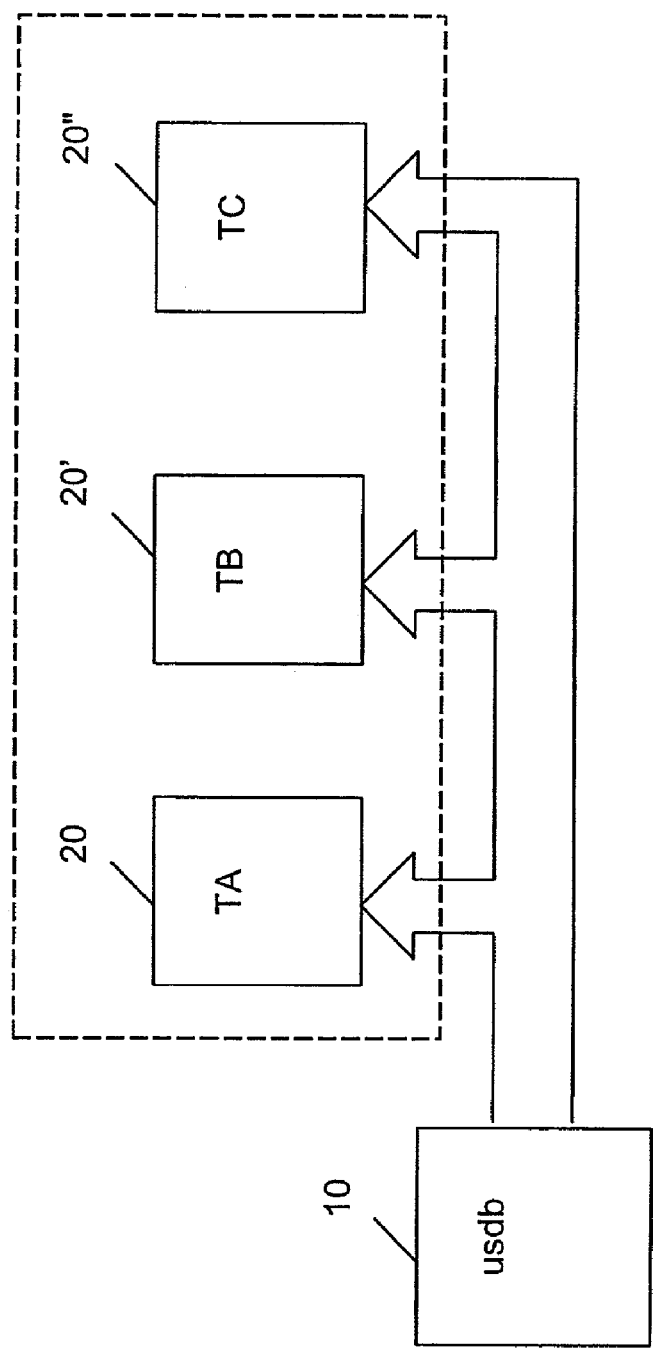
FIG. 3 is a schematic representation of a process for debugging different threads, in which one instance of usdb controls threads TA, TB and TC simultaneously.
Figure 4:
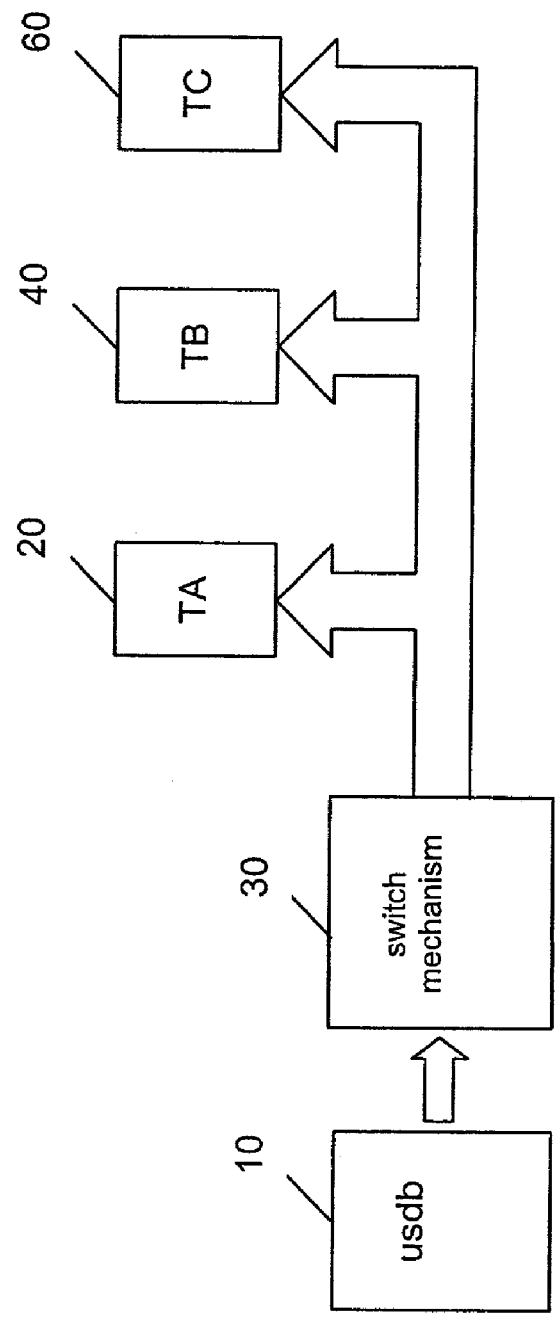
FIG. 4 is a schematic representation of an example arrangement of how a single instance usdb debugs threads TA, TB and TC via a "switch mechanism".

FIG. 4 is similar to FIG. 3. However, FIG. 4 schematically represents a "switch" mechanism 30 that acts as a link between usdb 10 and tasks 20, 40, 60 (TA, TB and TC). The switch mechanism maintains task information (like task ID etc) for each individual task TA, TB and TC. usdb operates as if there is only one task, and all system calls made by usdb are directed to that task. The function of the switch mechanism is to intercept these requests (or system calls) and direct them to the appropriate task (that is, either TA, TB or TC). This ability to intercept debugging related system calls made by usdb allows the switch mechanism to operate as intended.

The operation of the switch mechanism of FIG. 4 is described in further detail below to achieve described advantages.

Application of the Switch

Figure 5:
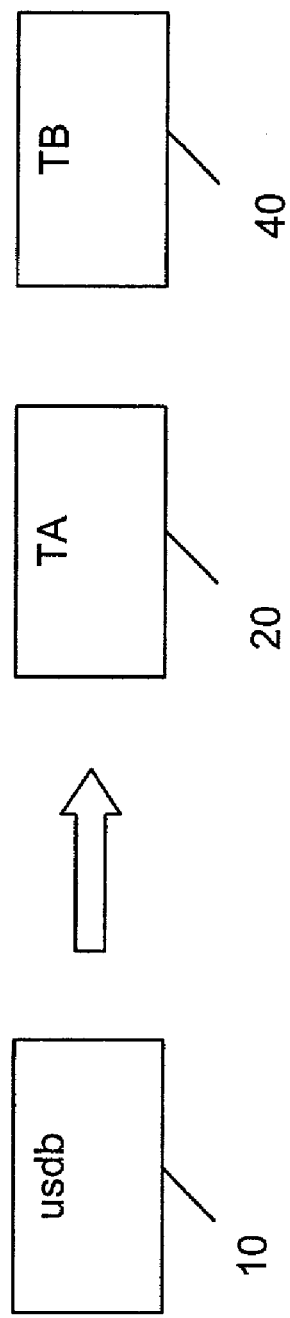
FIG. 5 is a schematic representation of the interaction between one instance of usdb and two tasks.

The application of the switch is best illustrated by considering the situation illustrated in FIG. 5.

In FIG. 5, usdb is a single instance of a user-space debugger. TA is one task and TB is another task. The two are instances of the same program i.e. they run the same piece of code. The two tasks do not share resources such as address space, signal handler etc. In other words, the tasks represented in are not threads that belong to the same process, nor do they have a parent-child relationship. The implication of this is that in order to debug TA and TB simultaneously, two instances of usdb are needed, one instance per task. This situation is represented in FIG. 6.

Figure 6:
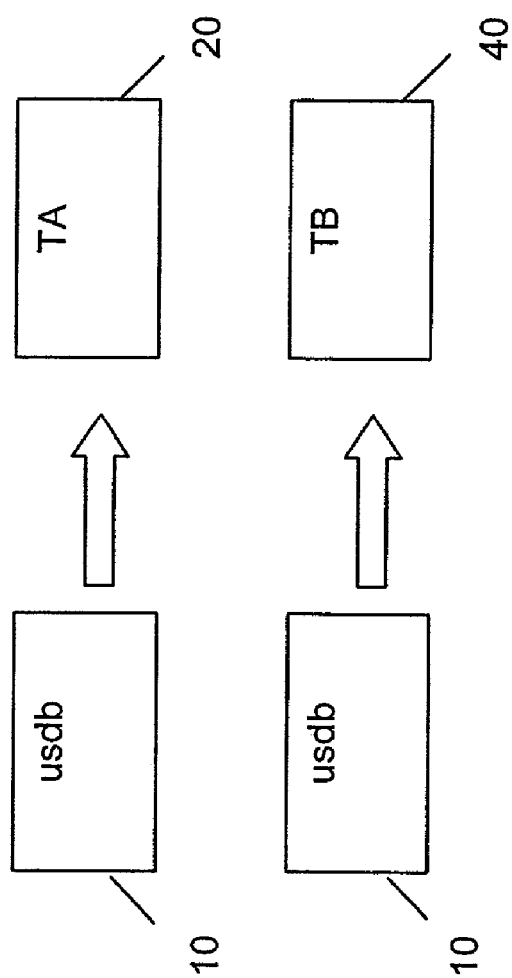
FIG. 6 is a schematic representation of two instances of usdb interacting with two respective tasks.

Some disadvantages associated with the arrangement represented in FIG. 6 are:

- A single point of control for debugging/controlling tasks TA and TB cannot be provided. A single point of control is desirable when the multiple tasks are related (that is, are part of the same application).
- Increasing the number of such tasks also increases the number of corresponding instances of usdb. This causes a corresponding increase in system load, leading to a performance degradation.

Figure 7:
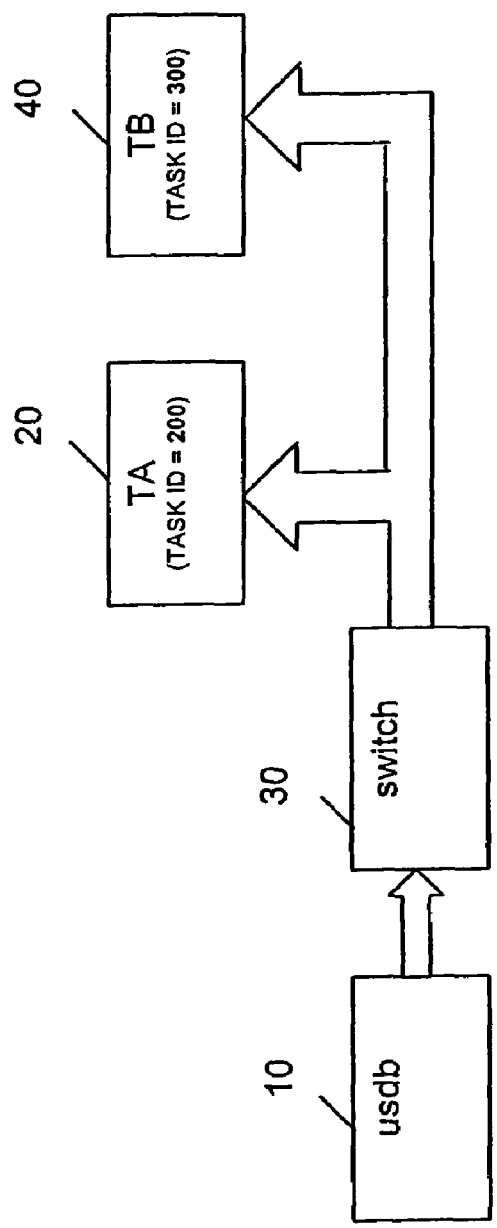
FIG. 7 schematically represents the a single instance of usdb interacting with two threads via a "switch mechanism".

The switch mechanism described herein allows a single instance of usdb to work with multiple tasks, without the usdb being actually aware of it. FIG. 7 represents the usage of such a switch.

The switch in FIG. 7 acts as a liaison between usdb and the tasks TA and TB. The role of the switch is to help the single instance of usdb to debug/control both TA and TB simultaneously in a transparent manner.

Task Relationship

Figure 8:
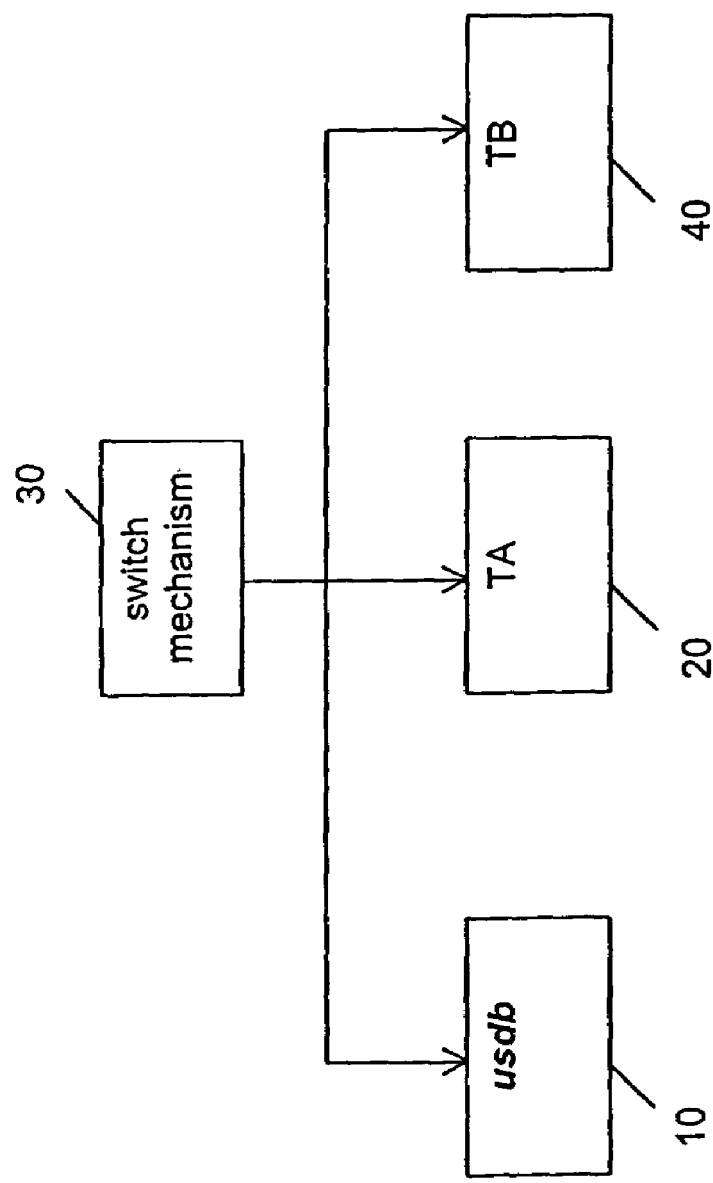
FIG. 8 is a schematic representation of the tasks relationship between a switch mechanism, usdb and debugee tasks.

The switch is a separate task. The task relationship between the various tasks in FIG. 7 is represented in FIG. 8.

The switch is shown as the parent task for usdb, TA and TB. This setup allows the switch to intercept system calls being made by its child tasks. The switch also manipulates system call arguments. For example, if usdb issues a ptrace system call as:

>   ptrace(PTRACE_ATTACH, 100, NULL, NULL);

This system call is used to attach to a task whose TASK ID is 100. The switch can intercept this system call and manipulate the system call arguments. For example, the switch can modify the above system call as:

>   ptrace(PTRACE_ATTACH, 200, NULL, NULL);

where 200 is the TASK ID of TA. This leads to usdb being attached to TA. The fact that usdb is attached to TA (of TASK ID 200) instead of a task of TASK ID 100 is not known to usdb.

Using the system-call interception mechanism described above (and a false wakeup mechanism described below), usdb can control both TA and TB transparently, thus providing a single point of control for debugging TA and TB. This is achieved without modification to usdb.

Note that the task relationship shown in FIG. 8 is strictly not necessary. The switch can be an independent task (not a parent of TA, TB and usdb) and can be made to attach to those tasks. This attachment (through PTRACE_ATTACH) allows the switch to operate as intended.

Operation of Switch

The operating mechanism of the switch is described with reference to FIGS. 9 to 20. Particular variables and commands are used to implement the switch mechanism, as described. The variables are added as part of the source code of TA and TB (in case the source code of TA/TB is not available, the section on "Separating out the switch mechanism" discusses an alternative approach). The commands are added as "user-defined" command in the usdb (most user-space debuggers allows users to add their own commands and define the commends as the user wishes). These commands are described for the operation of the switch, and are not essential.

Variables

1. The debug_task variable is a pointer to the task being debugged. All debug related system calls issued by the usdb are modified to have the TID of the task specified by the debug_task variable.
2. The sw_request variable is set to 1 by the debugger to instruct the "switch" to switch to a different task.
3. The sw_task variable is set by the debugger to the TASK ID to which the "switch" is to switch.

Commands

1. The switch command is a user-defined command that instructs usdb to switch to a different task. This command is defined in usdb. For example:

| | |
|---|---|
| switch 1 | // switches to TASK 1. |
| switch 10 | // switches to TASK 10. |

The definition of the switch command is provided later in this document. The switch maintains a table of information for the debugees that the switch controls. One entry exists for each debugee of which the switch is aware, or controls. The numbers 1 and 10 provided as an argument in the switch command above serve as an index into such an array. These numbers are not TIDs by themselves, but they are some logical numbers that represent the tasks being debugged.

After the switch is over (that is, after the command has executed), the debugger can view the execution context (registers, stack trace etc) of the task that is currently active (that is, to which the debugger has switched).

2. The curtask command is a user-defined command to report the current task that is "attached".

An explanation of two terms used below is provided as follows:

debugger request
   A "debugger request" is an event that causes usdb to stop. As explained above, usdb is started under the control of the switch. The switch can trace usdb, as the switch is the parent task of usdb. This means any system call being made by usdb stops usdb until the switch examines the system call. Also, usdb stops when usdb receives any signal delivered by the operating system. Such events that cause usdb to stop are termed as "debugger requests". The switch becomes aware of such events as they occur. If usdb stops because of a system call, the switch can alter the system call arguments, change the system call into another system call, manipulate system call arguments etc.

debug event
   A "debug event" is an event that causes either TA or TB (that is, debugees) to stop. Debug events occur when either TA or TB hit a breakpoint. Any signal delivered to either TA or TB causes these tasks to stop. However, such events are not be classified as debug events for the purposes of the description given herein.

Psuedo-Code for Process

The following steps 1 to 22 describe an algorithm (in psuedo-code form) preformed by the switch. Some assumptions are made in this:

The task ID of TA and TB is assumed to be 200 and 300 respectively (as shown in FIG. 7).
   In the table that is maintained by the switch, TA is at index 0 and TB is at index 1. This means debug_task=0 represents TA and debug_task=1 represents TB.
   Also, the switch code/variable required is assumed to be introduced as part of the source code of TA and TB.
   This discussion also assumes that TA, TB and switch all share the same text/data segment. In order to achieve this, the switch copies the data segment to a file, removes (unmaps) the data segment and mmaps the file in place of the data segment. The same process is performed for the text segment also. All the tasks subsequently created by the switch share the same mmap'ed text/data segment. This scheme allows the switch to examine the value of variables sw_request, debug_task etc. This scheme is strictly not necessary for the operation of the switch. Refer to the section entitled "Separating out the switch". The switch and TA, TB need not share the same text/data segment if variables are not used.

1. Initialize debug_task to 0
2. Launch and start the tasks TA and TB.
3. Launch and start usdb. The switch will make arrangements for tracing all the system call being made by usdb.
4. Wait for a debugger request or a debug event.
5. When usdb starts, usdb presents a command prompt to the debugger, where he/she can enter various commands. The commands that need to be issued at this prompt are:

| | |
|---|---|
| (a) attach 100 | // 100 is a logical TID |
| (b) break foo | |
| (c) continue | |

6. All the initial system calls that are made by usdb are directed towards TA since debug_task is 0.
7. The attach command issued in Step 5a above causes usdb to issues the PTRACE_ATTACH system call in order to attach to TID 100. When the switch detects this system call made by usdb the switch stops tasks TA and TB. The switch then "cancels" the PTRACE_ATTACH system call by converting the system call into a getpid system call. If this, is not performed the PTRACE_ATTACH system call fails for usdb (as there is no task of TID 100). usdb treats this as an error condition, and ends.
8. The break command (issued in Step 5b above) will cause usdb to issue a PTRACE_POKEDATA system call directed against TID 100. When the switch detects this, the switch directs the PTRACE_POKEDATA system call at TA instead (since debug_task=0) and cancels the system calls issued by usdb (by converting this system call into a getpid system call). Note that PTRACE_POKEDATA is used to modify the memory (in this case text segment) of the target process. usdb uses this call to insert a special instruction at the entry of function foo. When either TA or TB execute foo, the task receives a debug event and stops.
9. The continue command (issued in Step 5c above) causes usdb to issue a PTRACE_CONT system call directed against TID 100. When the switch detects this, the switch resumes the stopped task TA or TB, and cancels the system all issued by usdb.
10. The continue command (issued in Step 5c above) also causes usdb to issue a wait system call. The switch detects this call and keeps usdb stopped until either TA or TB hits a breakpoint. What this means is that the "continue" command issued in Step 5c above blocks until TA or TB hits a breakpoint.
11. TB (for example) hits the function "foo" breakpoint and stops. The switch mechanism notices this and stops other tasks too (that is, TA), sets debug_task to 1 and wakes up usdb (which was stopped in step 10).
12. The continue command (issued in Step 5c) returns when usdb is woken. usdb again presents a command prompt, at which the user can enter any command. The user can, for example, enter the "regs" command to display the register values.
13. All the ptrace calls that usdb now issues are directed towards TB and fetch the execution status of TB. The register values that usdb displays to the user are that of TB.
14. The user now wants to know the execution context of TA as well. The user issues the "switch 0" command at the usdb command prompt. The switch command is a user-defined command and (internally) performs the following command:
  (a) assign sw_task=0
  (b) assign sw_request=1
  (c) continue
  Two variables are not in this case strictly necessary.
15. The assign command issued in Step 14a is used to modify the memory of a target task. This causes usdb to issue a PTRACE_POKEDATA system call. The switch redirects this call at TB (since debug_task is 1). The switch then cancels the system call issued by usdb.
16. Step 14b causes usdb to issue another PTRACE_POKEDATA system call. This system call is again redirected towards TB. The switch then cancels the system call issued by usdb
17. Step 14c cause usdb to issue a PTRACE_CONT call directed at TID 100. This "continue" command makes usdb think that the task state is changing and causes usdb to "refresh" the execution context when the task next "stops". When the switch detects this PTRACE_CONT call, the switch checks if sw_request is set to 1 (that is, true). If so, the switch simply cancels the system call issued by usdb. TA and TB are still stopped at this stage and hence their execution context has not changed. The action taken by the switch for the PTRACE_CONT system call is different from the action taken in Step 9.
18. Step 14c causes usdb to issue a wait call. Normally this should have caused usdb to block till another "real" debug event occurs. However, since SW_request is set to 1, the switch does not take the normal course of action. Instead, the switch changes debug_task to the value indicated by sw_task (which is set to 0) and immediately wakes up usdb. This is a "false" wakeup as there is no "real" debug event associated with this wakeup. This false wakeup mechanism is described in further detail below in the section entitled "False wakeup mechanism".
19. Step 18 leads to the completion of the "continue" command (issued in Step 14c above) and the user is presented the command prompt again. This "continue" command was needed to force usdb to act as if the task state is changing.
20. The user enters the "regs" command at the usdb command prompt.
21. This causes usdb to issue a PTRACE_GETRREGS system call directed at TID 100. This call is intercepted by the switch and redirected at TA now (since debug_task is 0). The switch then cancels the system call issued by the usdb.
22. The register values now displayed by the usdb are that of TA.

Thus, usdb is effectively "fooled" into providing multiple execution contexts, despite the fact that usdb assumes the existence of only a single process (that is, TID 100).

Explanation of the Flow Chart

Figure 9:
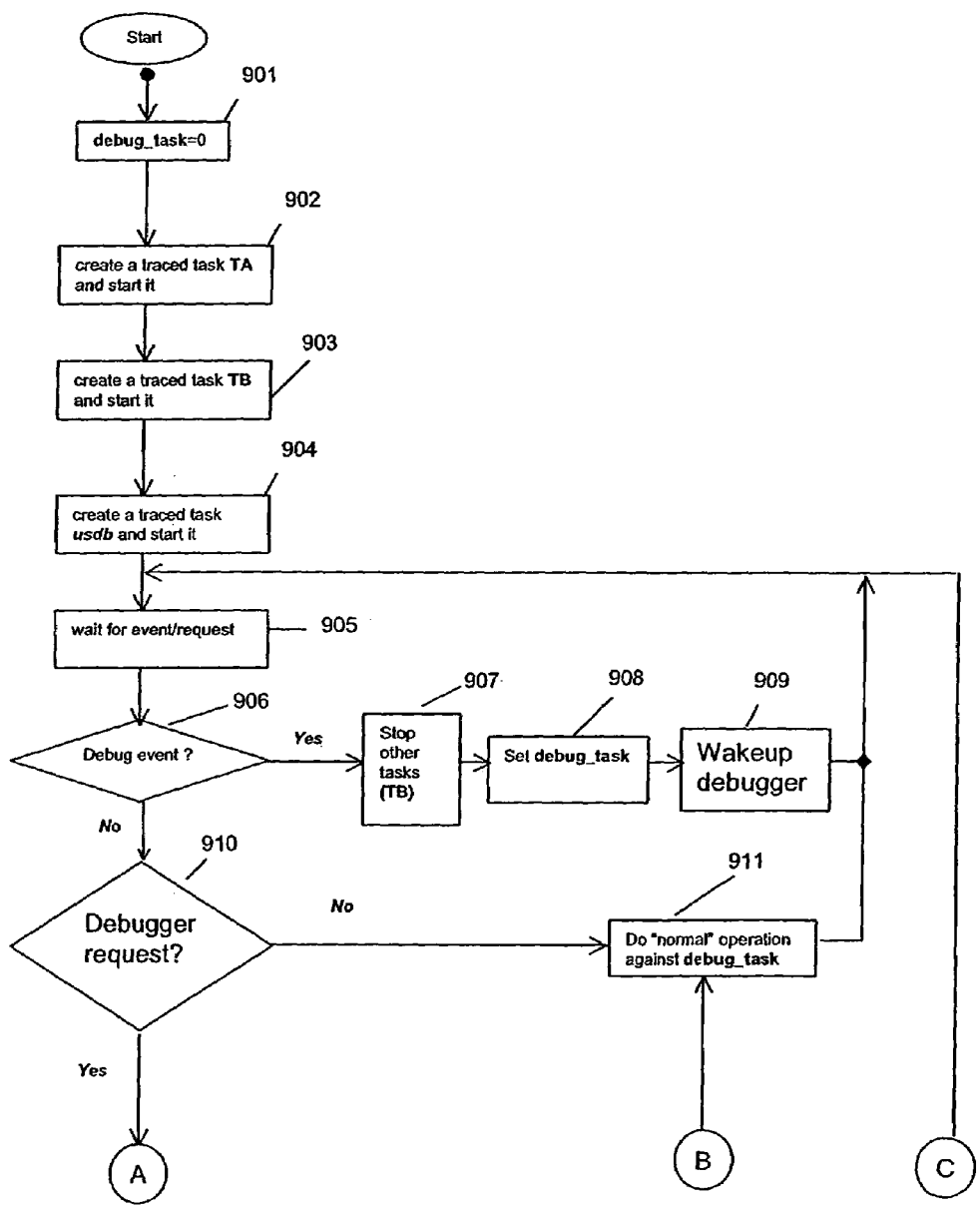
FIGS. 9 to 11 jointly represent a flowchart representing the process that occur in debugging application programs using the switch mechanism of FIG. 4.
Figure 10:
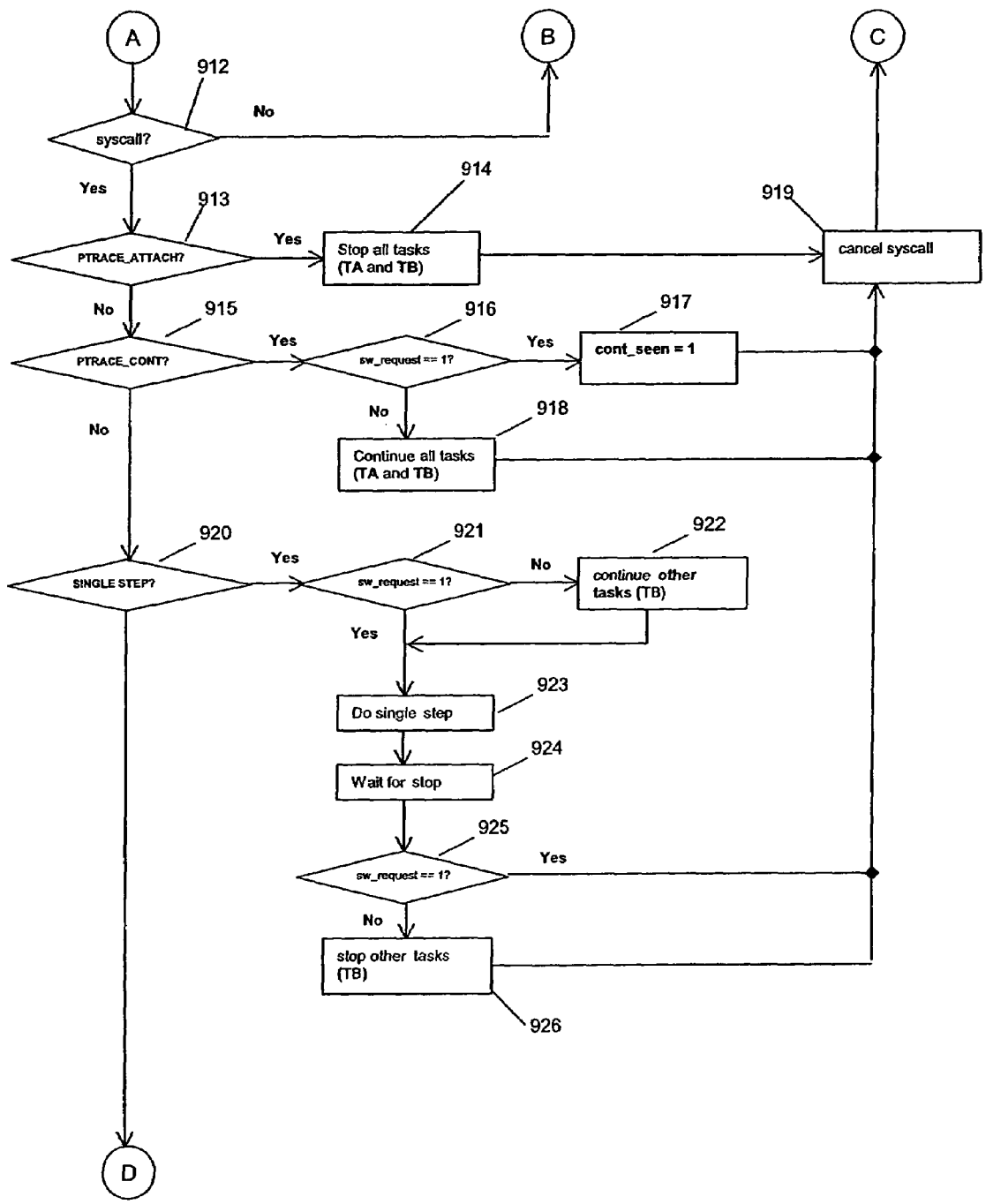
Figure 11:
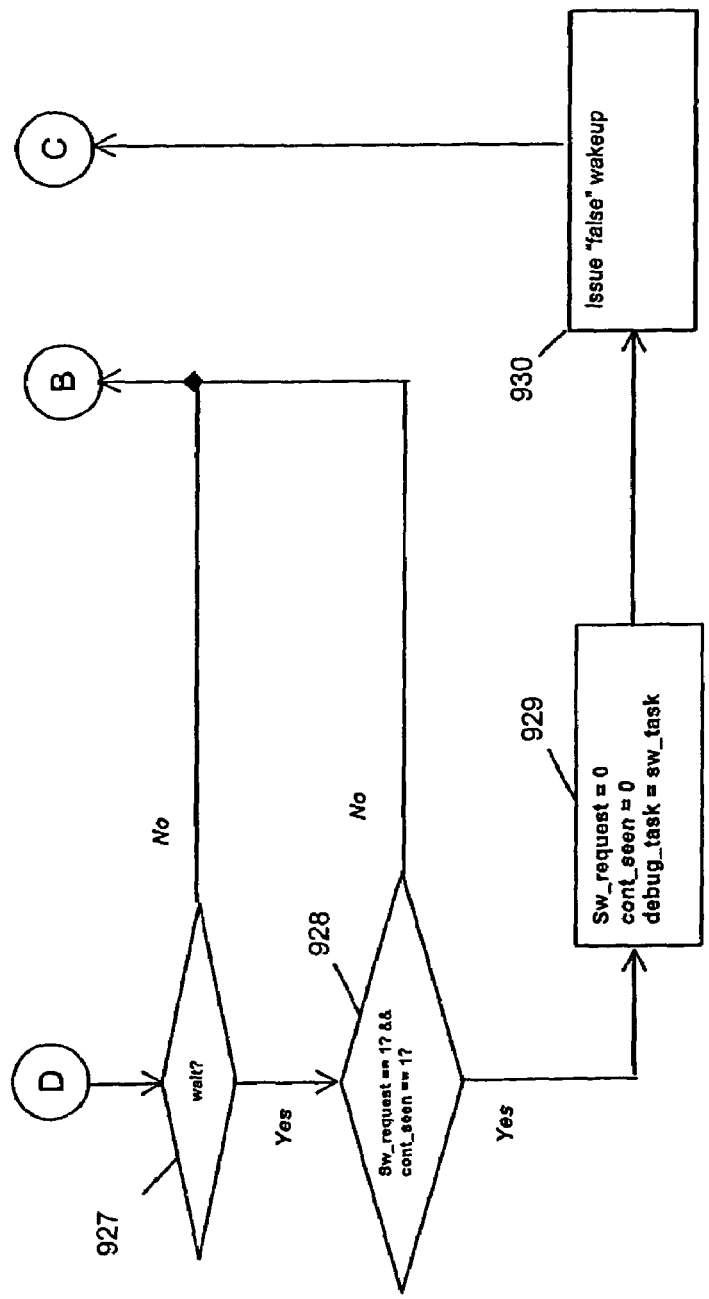
Figure 12:
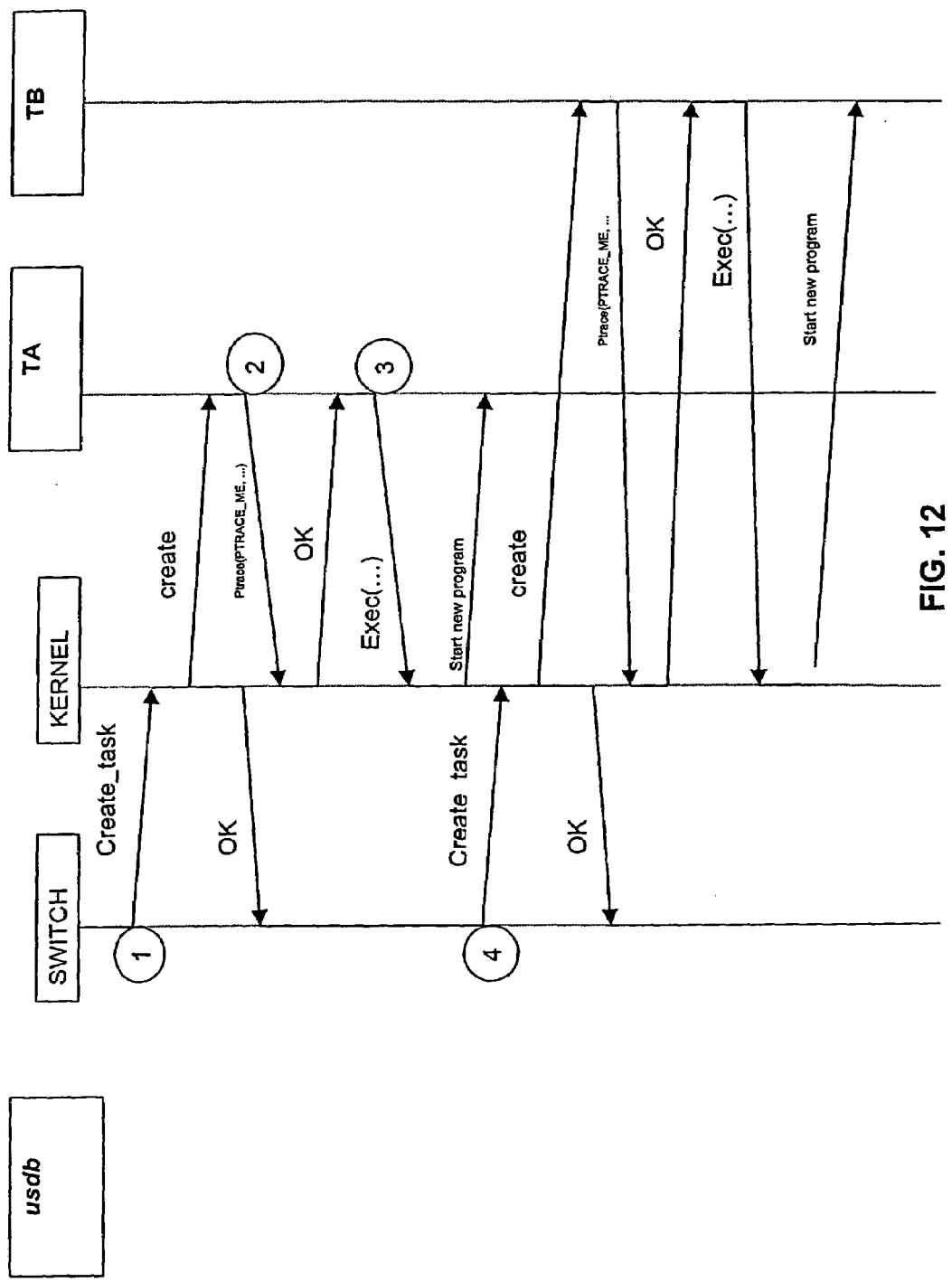
FIGS. 12 to 20 jointly represent a sequence flow diagram of the interaction between the debugger, the switch mechanism and two debugee tasks.
Figure 13:
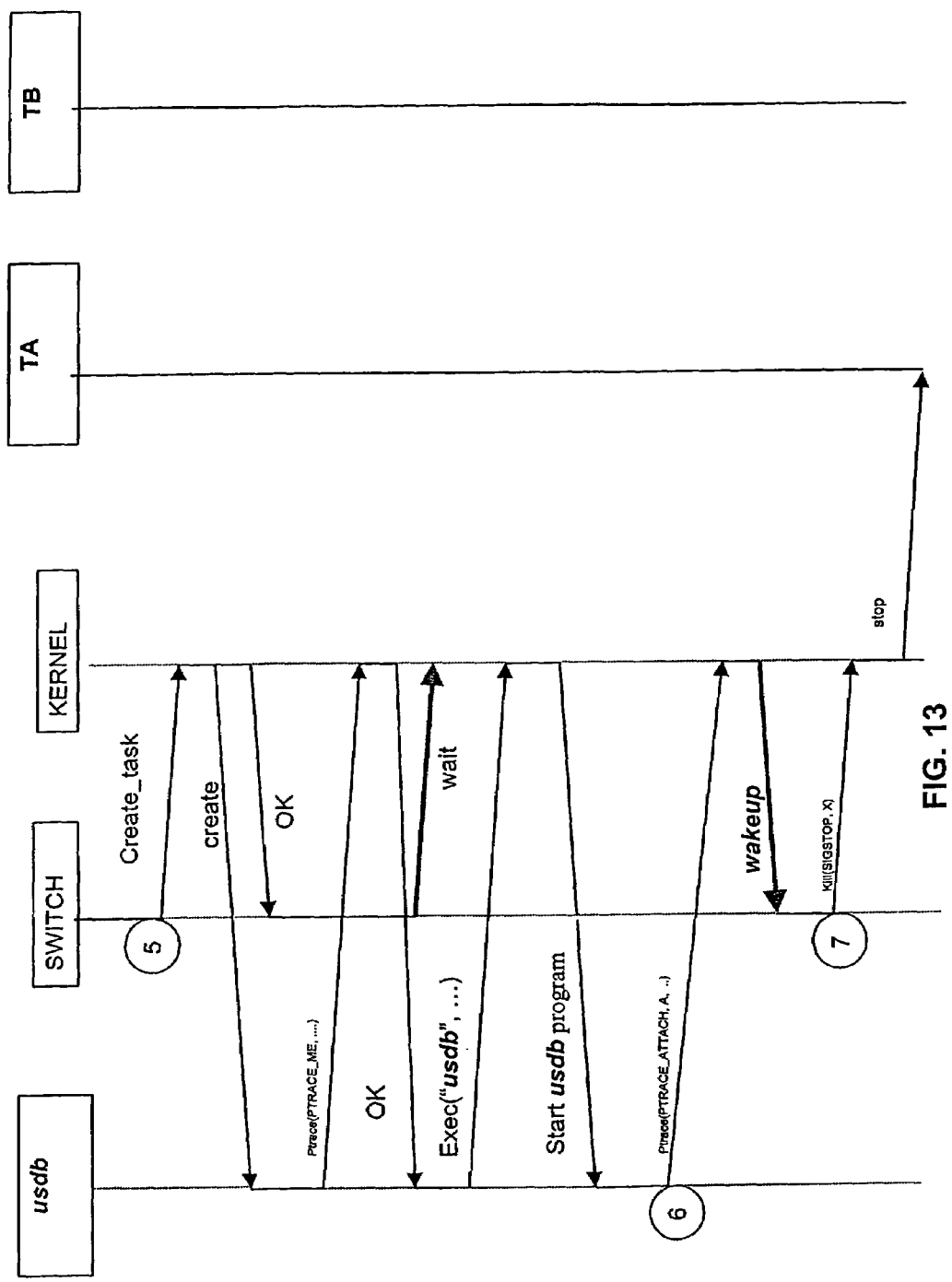
Figure 14:
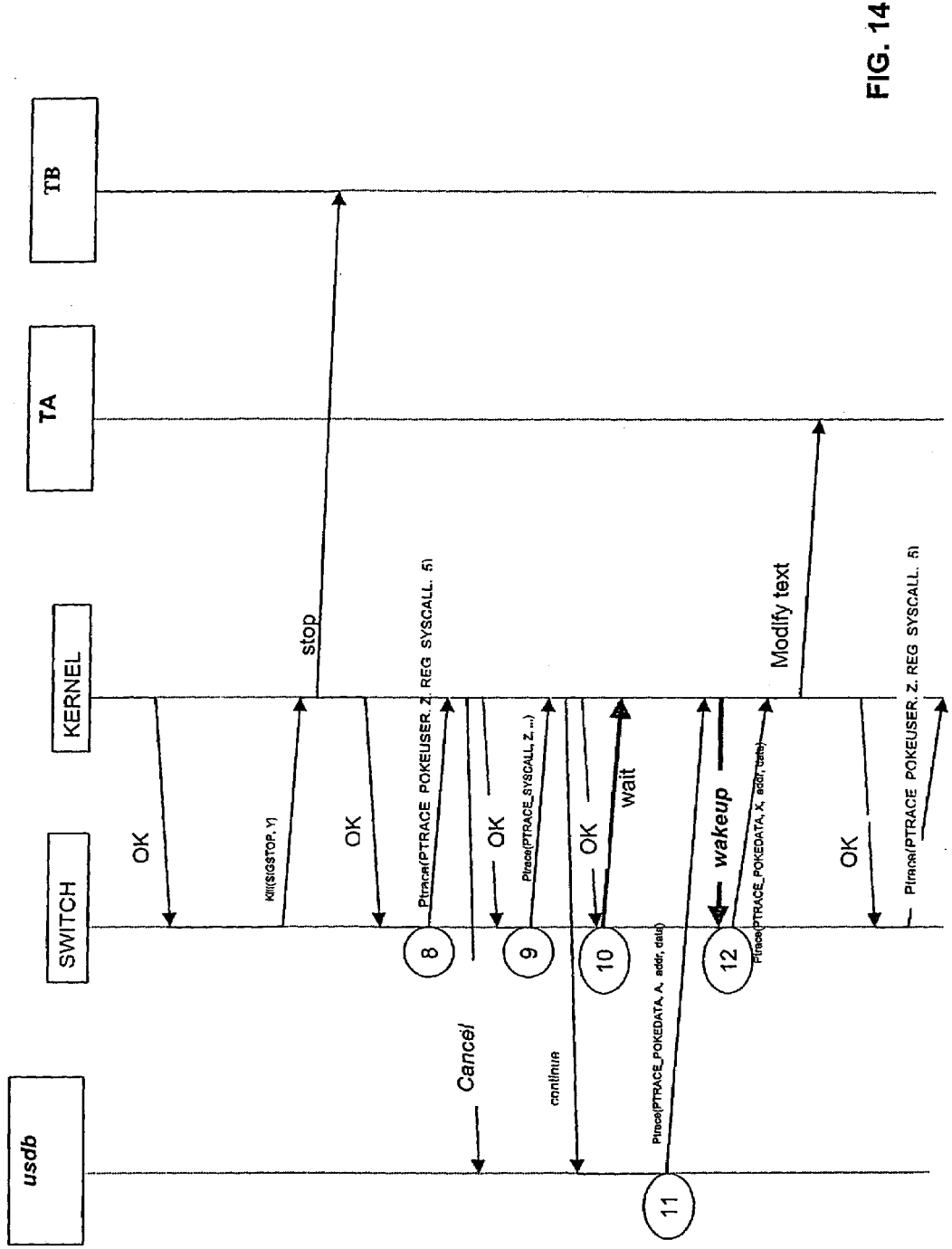
Figure 15:
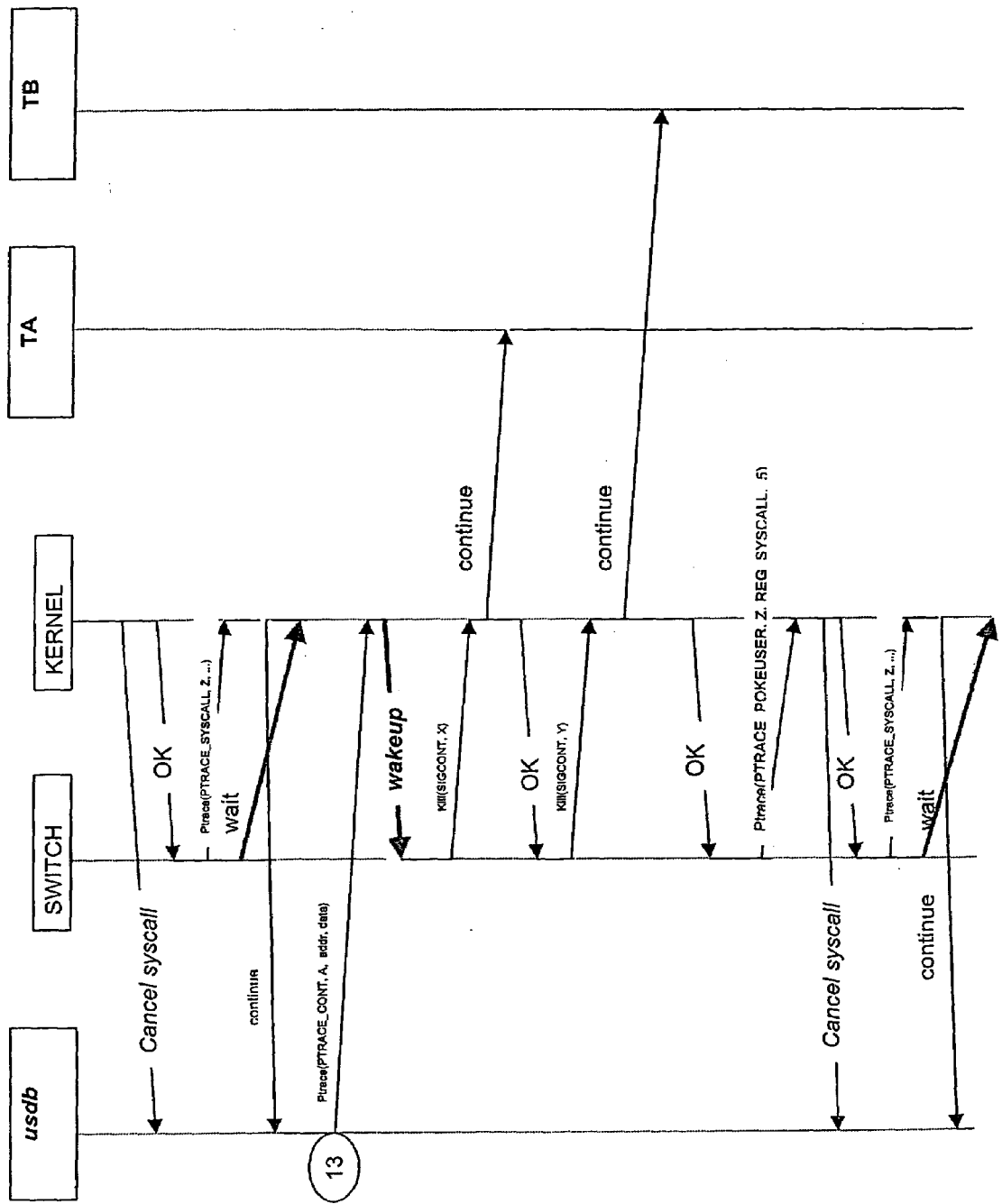
Figure 16:
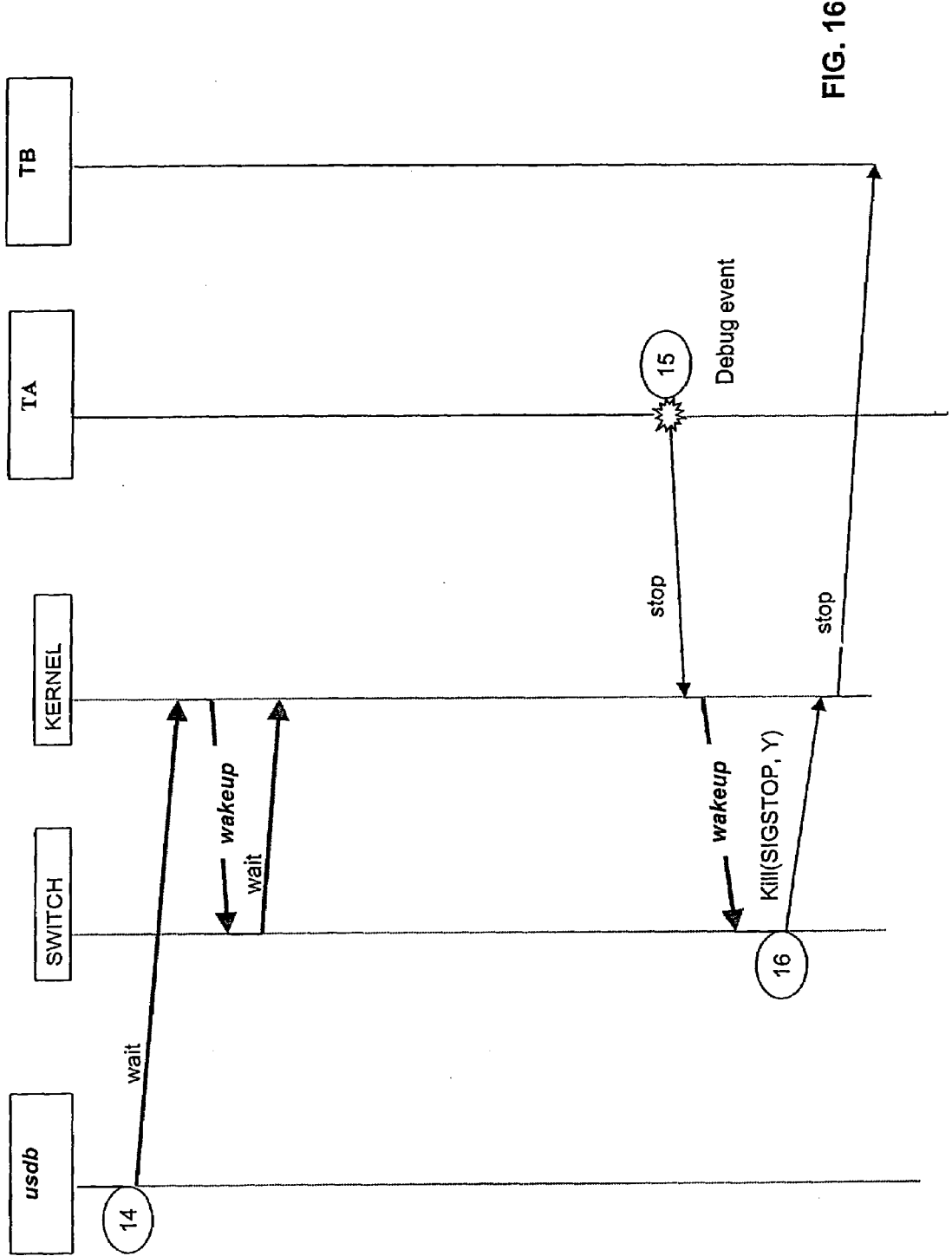
Figure 17:
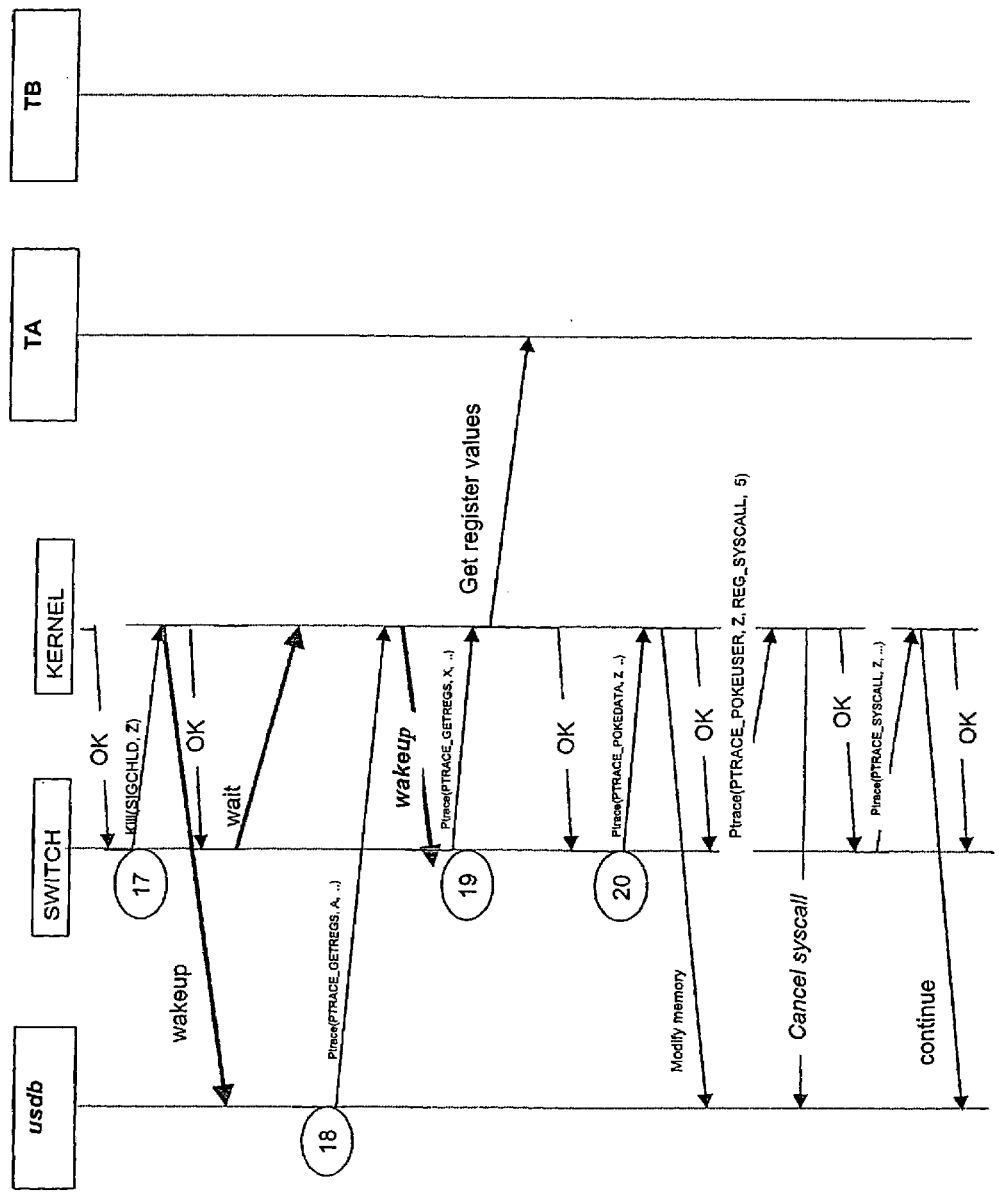
Figure 18:
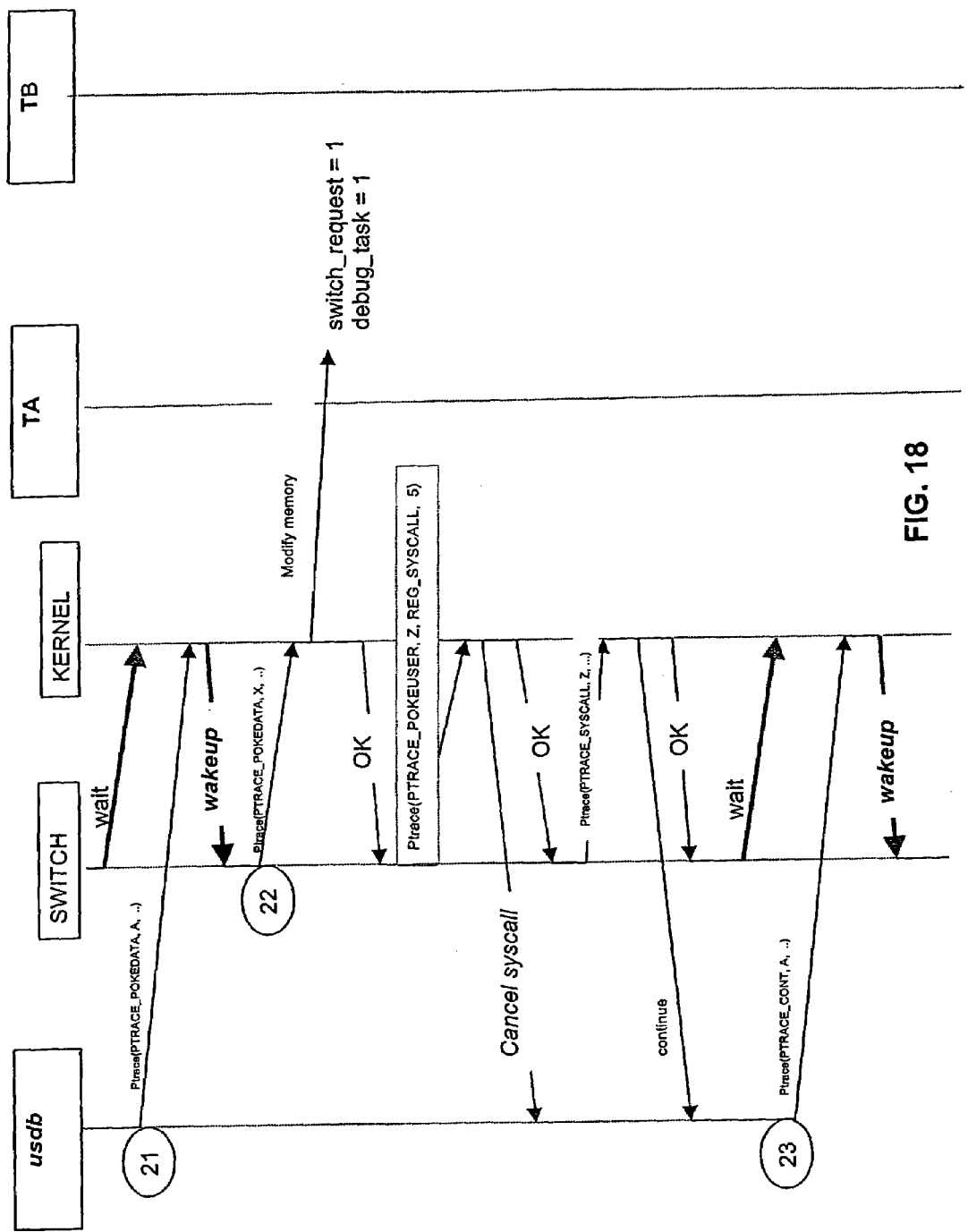
Figure 19:
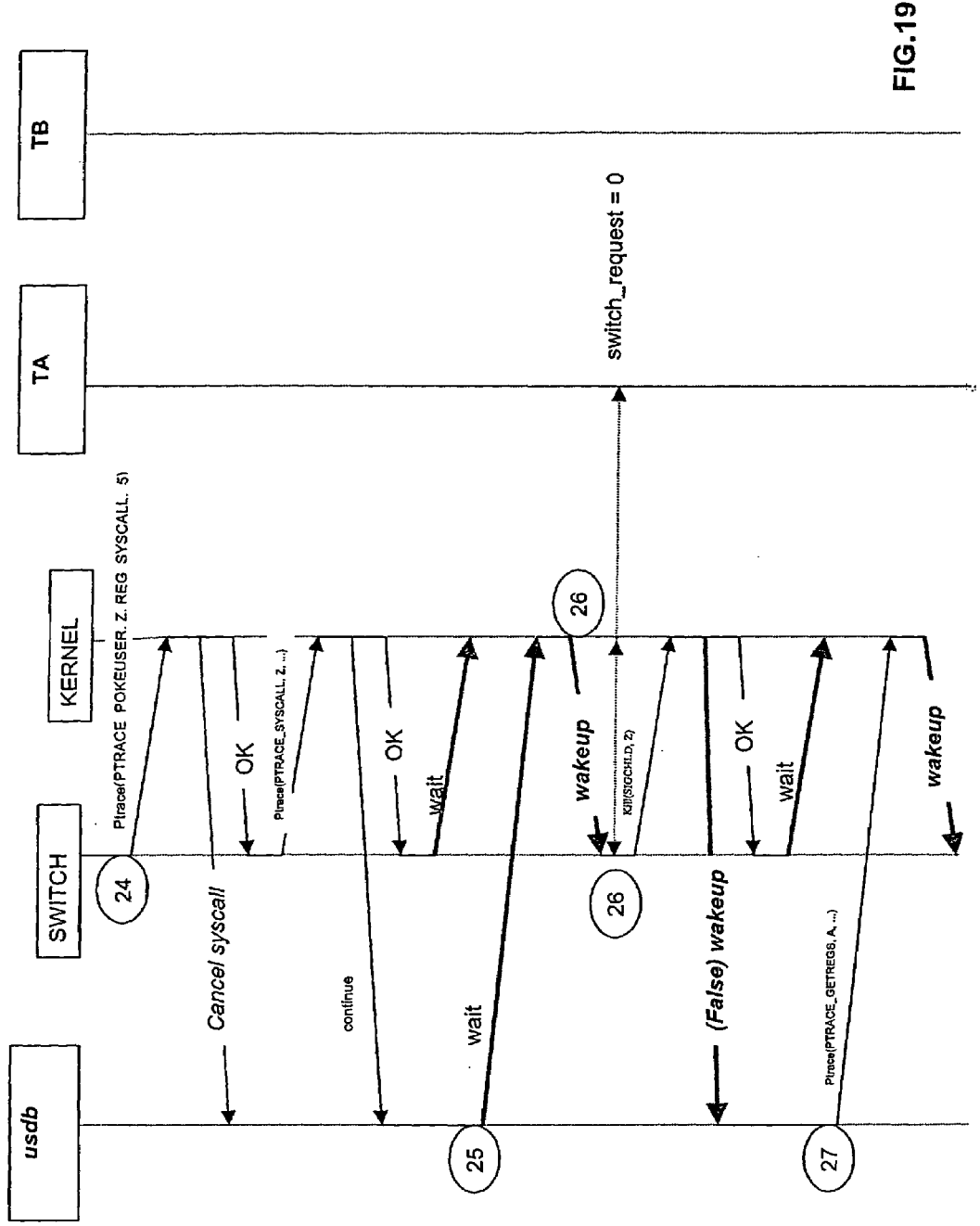
Figure 20:
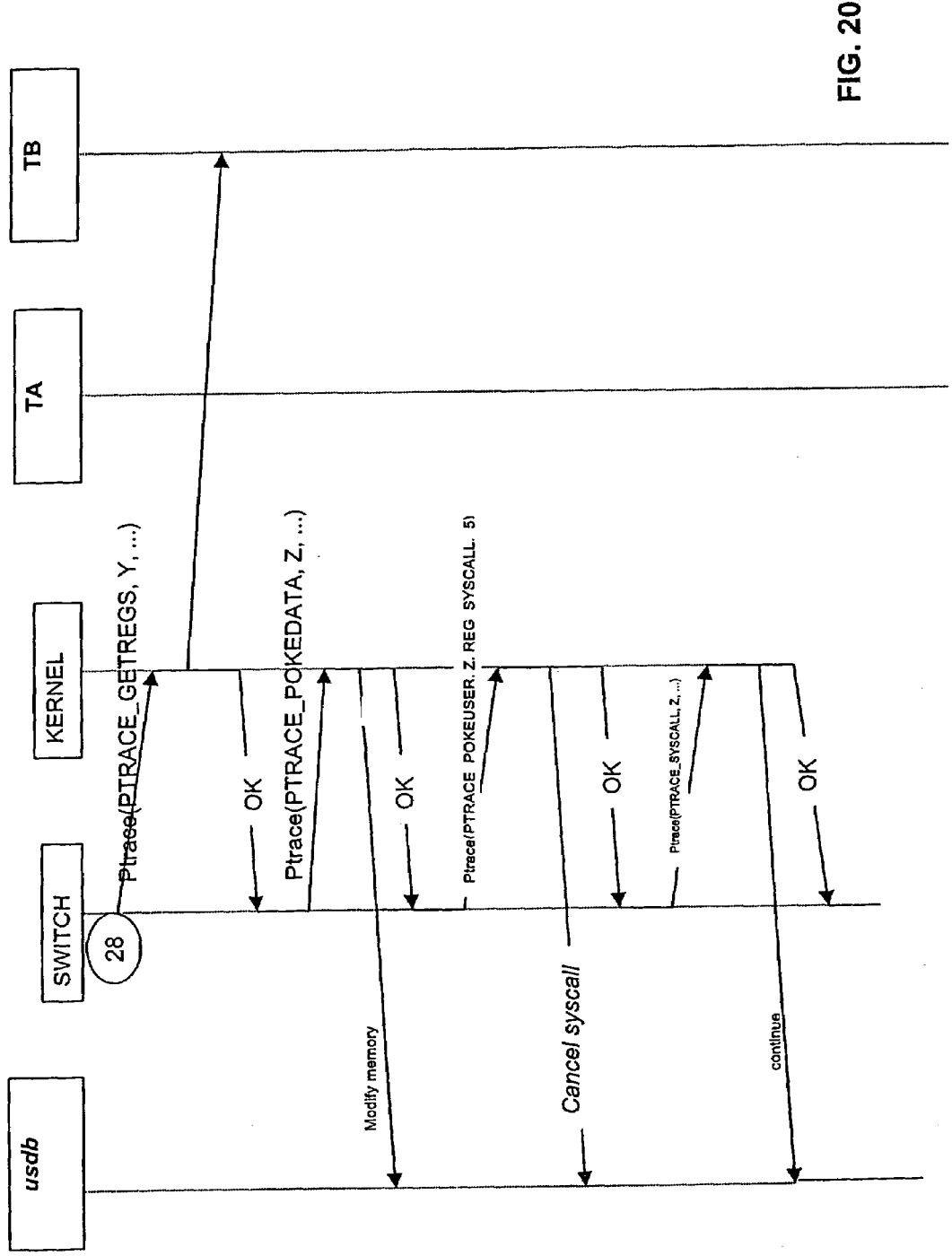

FIGS. 9, 10 and 11 jointly represent a flowchart of for the mechanism of the switch operation.

Each of the steps of FIGS. 9, 10 and 11 is now briefly described with reference to the corresponding description given in relation to the above-described psuedo-code.

First, debug_task is set to 0 in step 901. In step 902, the "traced" task TA is created and started. A "traced" task is a task that the switch is able to trace, in terms of the system calls the task makes, signals the task receives etc. Likewise, in steps 903 and 904, the traced tasks TB and usdb are created and started.

In following step 905, the debugger waits for a debug event or debugger request. This wait is done through the use of "wait" system call. The wait system call is blocking. In other words, wait system call does not return until some event happens. This causes the switch to sleep until an event occurs. This event can be either a debug event or a debugger request. When such an event occurs, the operating system wakes the switch from its sleep.

In step 906, the switch examines why the switch was woken up. If the switch is woken because of a debug event, then other tasks are stopped in step 908. debug_task is set in step 910 to the current CPU, and the debugger is woken up in step 912. Once these steps 908 to 912 are performed, the process returns to step 904.

If the debugger is not because of a debug event, then the switch examines (in step 910) if the debugger was woken up because of debugger request. If not, the switch proceeds to do the "normal" operation against debug_task. This is possible when either TA or TB has stopped when they are about to receive a signal. In this case, the "normal" operation is performed for such events, using the task id corresponding to debug_task if required. After this normal operation is complete, the switch returns back to step 905.

If the switch was woken up because of a debugger request, a determination is made (in step 912) whether this represents a system call being made by usdb. If not, a normal operation is performed against debug_task in step 911. The process then again returns to step 905 to await the next debug event or debugger request.

If a system call exists in step 912, a determination is made (in step 913) whether the system call is a PTRACE_ATTACH system call. If so, this represents usdb's request to attach to a particular task. In this case, the switch stops the running tasks TA and TB first (in step 914). usdb then cancels the PTRACE_ATTACH system call by converting this system call into a getpid system call (in step 919).

If the system call is a PTRACE_SINGLE_STEP system call, then a determined is made if sw_request=1. If so, then cont_seen is set to 1, and the process returns to step 919. Otherwise, if sw_request≠1, all tasks are continued in step 918, and the process returns to step 919.

If the system call is a PTRACE_SINGLE_STEP system call, a determination is made in step 921 if sw_request=1. If sw_request≠1, then other tasks (tasks apart from the task represented by debug_task) are continued (made running) in step 922. If sw_request=1, a single step operation is performed against the task which is represented by debug_tasks. The switch then waits for the task (represented by debug_task) to stop in step 924. If sw_request does not equal 1, then other tasks (tasks apart from that represented by debug_task) are continued in step 926 before going to step 919.

If the system call is a WAIT system call, then a determination is made whether sw_request=1 and cont_seen=1 in step 928. If both conditions exist, then both these parameters sw_request and cont_seen are reset to zero, and debug_task is set to sw_task in step 929. A false wakeup call is then sent to the debugger in step 930, and the process returns to step 905.

Sequence Diagram—False Wakeup Mechanism

A sequence diagram that illustrates the switching process in greater depth is provided below. This also clearly explains the "false" wakeup involved in switching context.

FIGS. 12 to 20 schematically represent the sequence flow involved in the interaction of the debugger, the switch mechanism and two debugees. These FIGS. 12 to 20 show the interaction of the debugger with two debugees having task ID X (=200) and Y (=300) respectively, with the switch acting as an intermediary. The debugger is represented as having TID Z.

The following numbered points listed below relate to correspondingly numbered items marked in FIGS. 12 to 20.
1. The switch is the first program to start executing. The switch creates another task of TID X or TA. The mechanism of creating a new task may vary from system to system. On POSIX systems, a fork is usually used to create a new process. However, other system calls are available (such as clone on Linux) that also can be used to create new tasks. These calls create "threads". Multiple threads share the same address space. The term task is used herein as a generic term to denote either of a process or a thread. The switch works well with both processes and threads. Note that since the switch has created this task, the switch is aware that the task ID of the child task is X.
2. The child task (TID X) calls the ptrace (PTRACE_ME, . . . ) system call. This system call allows the child task to be traced by the parent task. This ability to trace the child task allows all system calls executed by the child task to be trapped by the parent task, The parent task can also trace the signals delivered to the child task. This is true even after the child task calls an exec system call.
3. The child task then uses the exec system call to execute the debugee program. As a result, the child image is replaced with that of the debugee. Because of step 2, the debugee is controlled by the switch.
4. The switch creates another task TB (TID Y). This child task TB also traces itself (using PTRACE_ME) and makes an exec system call to the same debugee program. The implication of the above steps is that tasks TA and TB are copies of the same program. Note that tasks TA and TB do not have a parent-child relationship.
5. The switch creates task TZ (TID Z). The child task also allows itself to be traced by the switch. The child task then executes the debugger program (usdb). usdb is then controlled by the switch.
6. usdb need not know the task ID of the debugee. usdb "thinks" that there is only one task having task ID A. The debugger attempts to attach to this task ID A using the ptrace (PTRACE_ATTACH, . . . ) system call.
7. The switch intercepts the PTRACE_ATTACH system call made by usdb. The switch stops the debugee tasks TA and TB. In the drawings, the debugee tasks TA and TB are shown as running up to this point, though this need not always be the case. After the switch creates tasks TA and TB, the switch can stop TA and TB immediately if required.
8. usdb is now stopped. The switch can modify system call number and its arguments, if required. This feature is accomplished using the ptrace (PTRACE_POKEUSER, . . . ) system call. This system call is used to cancel the ptrace (PTRACE_ATTACH, . . . ) system call issued by usdb in step 6. If this is not done, usdb's PTRACE_ATTACH fails (since there is no task with ID A) and usdb incorrectly recognizes an error condition and quits. Accordingly, this system call must be cancelled. The system call number of usdb is changed to that of the getpid ( ) system call.
9. The switch resumes usdb using the ptrace (PTRACE_SYSCALL, . . . ) system call. This causes usdb to continue until usdb encounters another debug event. Also the ptrace (PTRACE_ATTACH, . . . ) system call that was issued by usdb in step 6 is changed to the getpid ( ) system call in step 8. So, when usdb is resumed, usdb executes the getpid ( ) system call and continues executing until usdb makes another system call.
10. The switch issues a wait ( . . . ) system call. This blocks the switch until one of the switch's child tasks (that is, task ID X, Y or Z) stop.
11. The debugger now inserts a breakpoint. usdb uses the ptrace(PTRACE_POKEDATA, . . . ) system call to insert a breakpoint. This "wakes up" the switch. This event that causes the switch to wake up is termed as "debug request".
12. The switch directs this ptrace (PTRACE_POKEDATA, . . . ) system call to task TA.
13. usdb issues the ptrace (PTRACE_CONT, . . . ) system call. This system call is intercepted by the switch. The switch translates this system call to a kill (SIGCONT, . . . ) system call for resuming the stopped debugee tasks TA and TB. The switch later cancels the PTRACE_CONT system call issued by usdb.
14. usdb issues the wait ( . . . ) system call. This blocks usdb until a debug event occurs.
15. A debug event occurs. As the switch is tracing all its children tasks, the switch is notified of the debug event.
16. The switch then stops the other debugee TB. This step is optional. This step is required for virtual machine debuggers (refer to the subsection entitled "Application of switch" in this respect), but is not required for all other applications of the switch.
17. The switch wakes up usdb by sending the SIGCHLD signal to usdb.
18. usdb queries the execution context of (notional) task of TID A.
19. This query for the execution context is intercepted by the switch and is redirected to task TA. This redirection fetches the execution context of TA into a buffer that is the switch's local memory.
20. The register values obtained in step 19 are stored in usdb's memory using the ptrace (PTRACE_POKEDATA, . . . ) system call.
21. The context switch starts at this point. Two variables are used in the context switch. These variables are added to the debugee task's address space. In cases in which adding these variables to the debugee task is not possible, alternative steps occur as indicated in the subsection entitled "Separating out the switch". One variable is sw_request and the other is debug_task. sw_request is set to 1 when a context switch is to be performed. debug_task points to the task currently being debugged. In this step, usdb modifies the value of the variable sw_request to 1 using the ptrace (PTRACE_POKEDATA, . . . ) call. usdb also modifies the value of debug_task to 1 (indicating that usdb intends to switch to task TB).
22. The switch traps this ptrace (PTRACE_POKE, . . . ) system call and redirects this system call at task TA.
23. usdb issues the ptrace (PTRACE_CONT, . . . ) system call.
24. The switch intercepts this system call. Since sw_request is set to 1, the switch does not perform normal processing. Instead, the switch cancels usdb's system call.
25. usdb issues the wait ( . . . ) system call. This system call blocks usdb until a debug event occurs.
26. The switch traps this wait ( . . . ) system call. Since sw_request is set to 1, the switch immediately wakes up usdb leading to a false wake up. There is no "real" debug event associated with this wake up. Hence, this wake up is referred to as a "false" wake up. This false wake up step marks the end of the context switch. Step 26a (not shown in the drawings): in this step, the switch resets the value of sw_request to 0. This is accomplished by a ptrace (PTRACE_POKEDATA, . . . ) system call.
27. usdb is woken up now. usdb attempts to fetch the execution context of (virtual) task TA.
28. The switch intercepts this PTRACE_GETREGS system call and redirects the ptrace(PTRACE_GETREGS, . . . ) system call to TB (since debug_task is set to 1). This redirection fetches the execution context of TB into a local buffer in the switch's memory. The switch later stores this execution context result in usdb's memory using the ptrace (PTRACE_POKEDATA, . . . ) system call. Thus, usdb is "fooled" into providing the execution context of TB without its explicit knowledge; that is, as usdb is operating as usdb usually operates when debugging a single task.

Separating Out the Switch Mechanism

The switch mechanism described above requires modification of the target application (TA and TB) to include the switch code and variables sw_request, debug_task etc. In cases in which this is not feasible (for example, when the target application has been supplied by a vendor and the source code is not readily available), the switch code can be separated from (that is, made independent of) the target application. In this case, variables sw_request, debug_task etc are not present in the target application. The debugger indicates which task to switch to by using the arguments of the PTRACE_PEEKTEXT system call issued by usdb to examine memory. For example, on the usdb command line, the following commands are issued:

| usdb> x/c 0xffffffff | /* dump one byte of memory at 0xffffffff */ |
| usdb> continue | /* This will actually lead to a context switch to Task 0 */ |

The memory dump command (beginning with x/c) causes usdb to issue a PTRACE_PEEKTEXT system call with 0xffffffff as an argument. The switch mechanism can intercept this system call and use the memory location referred to in the system call as a hint for the task to which the task should switch. To switch to a different task, the following commands are issued:

| usdb> x/c 0xfffffff0 | /* dump one byte of memory at 0xffffffff */ |
| usdb> continue | /* This will actually lead to a context switch to Task 1 */ |

The memory dump command above causes the PTRACE_PEEKTEXT system call to be issued by usdb with an argument different from the argument of the first PTRACE_PEEKTEXT system call. The switch mechanism intercepts this system call again and uses the memory location argument as a hint to switch to a different task, when the continue command is issued.

The above described technique also operates for invalid memory locations that are not used by the target application.

Computer Hardware and Software

Figure 21:
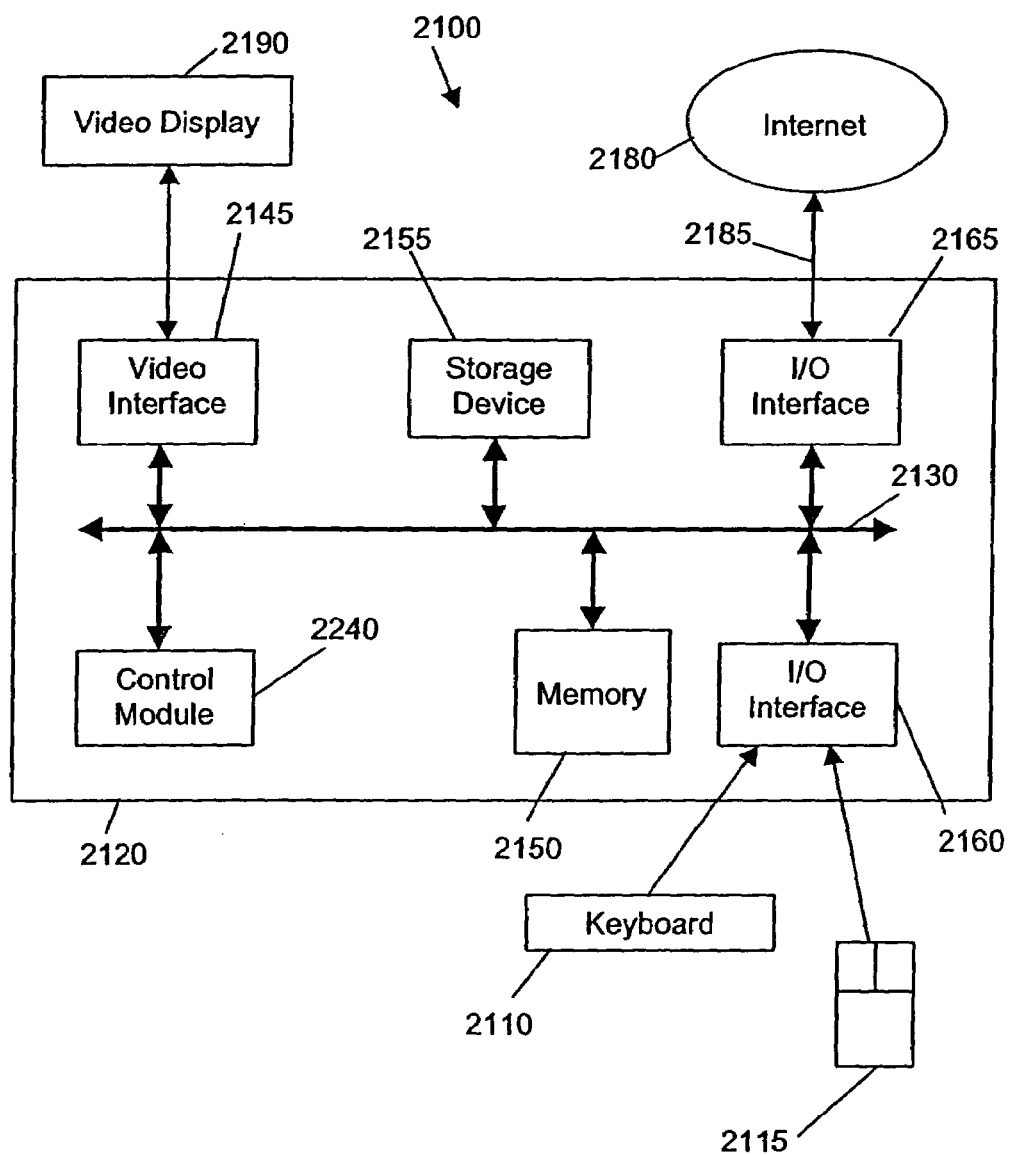
FIG. 21 is a schematic representation of a computing system on which the described arrangement represented in FIG. 4 can be implemented.

FIG. 21 is a schematic representation of a computer system 2100 that can be used to perform steps in a process those implements the techniques described herein. The computer system 2100 is provided for the purpose of executing computer software that is programmed to assist in performing the described techniques. This computer software executes under a suitable operating system installed on the computer system 2100.

The computer software involves a set of programmed logic instructions that are able to be interpreted by the computer system 2100 for instructing the computer system 2100 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means that perform particular steps in the process of the described techniques.

The components of the computer system 2100 include: a computer 2120, input devices 2110, 2115 and video display 2190. The computer 2120 includes: processor 2140, memory module 2150, input/output (I/O) interfaces 2160, 2165, video interface 2145, and storage device 2155.

The processor 2140 is a central processing unit (CPU) that executes the operating system and the computer software executing under the operating system. The memory module 2150 include random access memory (RAM) and read-only memory (ROM), and is used under direction of the processor 2140.

The video interface 2145 is connected to video display 2190 and provides video signals for display on the video display 2190. User input to operate the computer 2120 is provided from input devices 2110, 2115 consisting of keyboard 2110 and mouse 2115. The storage device 2155 can include a disk drive or any other suitable non-volatile storage medium.

Each of the components of the computer 2120 is connected to a bus 2130 that includes data, address, and control buses, to allow these components to communicate with each other via the bus 2130.

The computer system 2100 can be connected to one or more other similar computers via a input/output (I/O) interface 2165 using a communication channel 2185 to a network 2180, represented as the Internet.

The computer software program may be provided as a computer program product, and recorded on a portable storage medium. In this case the computer software program is accessed by the computer system 2100 from the storage device 2155. Alternatively, the computer software can be accessed directly from the network 2180 by the computer 2120. In either case, a user can interact with the computer system 2100 using the keyboard 2110 and mouse 2115 to operate the programmed computer software executing on the computer 2120.

The computer system 2100 is described for illustrative purposes: other configurations or types of computer systems can be equally well used to implement the described techniques. The foregoing is only an example of a particular type of computer system suitable for implementing the described techniques.

Advantages of Switching

Some of the advantages of the described switch mechanism are:

The switch mechanism provides a single point of control for monitoring all tasks. The switch mechanism allows the debugger to switch "context" from one task to the other transparently i.e without the debugger's explicit involvement in it.

The switch mechanism allows debuggers that do not otherwise support threading to support threading.

The switch mechanism allows varying levels of task abstraction to be provided. For example, different tasks TA, TB and TC need not belong to the same process. They can still be simultaneously debugged by using the switch mechanism.

The switch mechanism allows new thread creation to be incorporated into the debugger. For example, consider a system call "clone" used to create new threads. usdb (in its current form) recognizes (that is, is "aware" of) this system call and its function and detects all "clone" calls made by debugee applications to gather information about created threads. Now consider that a new interface (named createthread) becomes available to create threads. If a program starts using createthread to create new threads, createthread is not recognized by usdb and hence usdb is unable to control the newly created threads. Note that this is true only for those debuggers that detect the tasks in a debugee by trapping such system calls like clone.

Application of the Switch

The switch can be used in virtual machine debuggers to provide a single point of control for all the virtual processors, in which each virtual processor may represent one task. In a virtual machine, many tasks are execute on simulated processors. This is usually achieved by making only select tasks to run at a time. For example, consider simulation of a dual-processor system. There may be several tasks created in the virtual machine. However, only two (virtual) tasks are permitted to execute at any given time, while other processes are stopped.

A normal debugger can also be used with the aid of the switch to debug such a virtual machine. Since knowledge of which task is running at any given time is known only to the virtual machine scheduler, debug-related system calls are intercepted and redirected at the task that is "currently" running on the virtual processor. In addition to this, the switch can be used to provide a single point of control for all the virtual processors.

Extension of the Switch to Kernel Debuggers

The switch mechanism discussed above relates to user-space debuggers. However the same concept can be applied to kernel debuggers as well. Kernel debuggers typically control the kernel over a serial (hardware) connection. Kernel debuggers use system calls such as open, read, write etc. in order to control the kernel. The switch concept can be extended in this case, for example, to control two different kernels running on two different machines. In this case, the switch has to trap the open, read, write etc system calls and modify them accordingly. The implementation of the switch can vary as appropriate in the context of kernel debuggers, as would be apparent to one skilled in the art.

Conclusion

The switch mechanism described herein is not restricted to virtual machine debuggers and can be used in cases in which (identical) multiple threads are controlled without making the debugger aware of this control. In many implementations, identical threads are required because usdb reads only one symbol table and is aware of only "one" text.

The switch mechanism need not be a parent task to operate as intended. In this case, the switch mechanism can use the PTRACE_ATTACH system call to attach to debugee tasks.

Various alterations and modifications can be made to the techniques and arrangements described herein, as would be apparent to one skilled in the relevant art.

We claim:

1. A method of debugging multiple tasks in a computer system, wherein the method uses a single instance of a debugger application intended to be only capable of debugging a single task, the method comprising the steps of:

(i) executing only single instance of a debugger application under an operating system on the computer system, wherein the computer system includes memory and the memory includes registers;

(ii) executing first and second target tasks, wherein executing the debugger application includes executing system calls to services of the operating system;

(iii) executing a switch task;

(iv) intercepting the system calls by the switch task;

(v) setting a debug task variable by the switch task in response to one of the target tasks encountering a breakpoint, wherein the debug task variable indicates the one of the target tasks that encountered the breakpoint, and wherein in response to a first user-initiated register display command after the breakpoint the switch task directs a first set of register contents to the debugger application for displaying to the user, the first set of register contents being for the one of the target tasks indicated by the debug task variable;

(vi) setting, by the switch task, the debug task variable, to indicate a certain one of the target tasks in response to a command issued by a user of the debugger application for switching to the certain one of the target tasks;

(vii) signaling a false breakpoint to the debugger application by the switch task in response to the command issued by the user of the debugger application for switching to the certain one of the target tasks, so that the debugger application generates a command prompt for the user; and (viii) directing, by the switch task, a second set of register contents to the debugger application for displaying to the user, the directing of the second set of register contents to the debugger application being in response to a second user-initiated register display command executed after step (vii) and in response to the setting of the debug task variable by the switch task in step (vi), so that the second provided set of register contents is for the one of the target tasks indicated by the debug task variable set in step (vi).

2. The method as claimed in claim 1, wherein in step (ii) the first and second tasks are child tasks of the switch task.

3. The method as claimed in claim 1, including the step of maintaining information about the target tasks by the switch task, wherein the method includes changing, by the switch task, an argument of one of the intercepted system calls in response to the information maintained by the switch task.

4. The method as claimed in claim 3, wherein the information maintained by the switch task includes task identifiers for the target tasks and wherein changing the argument of one of the intercepted system calls by the switch task includes changing the argument into one of the task identifiers.

5. The method as claimed in claim 1, further comprising the step of:

receiving, from one of said first and second tasks, a system call intended for said debugger application.

6. The method as claimed in claim 1, further comprising the step of:

canceling one of said intercepted system calls from the debugger application, to avoid an error notification to said debugger application.

7. The method as claimed in claim 1, wherein said first and second tasks do not have a parent-child relationship.

8. The method as claimed in claim 1, wherein said first and second tasks have the same source code.

9. The method of claim 1, wherein the certain command of step (vi), which issued by the user for switching to the certain one of the target tasks and to which the switch task responsively signals a breakpoint, includes a certain memory examining system call;

wherein the operating system examines contents of the memory at a specified address in response to the memory examining system call, the memory address being specified by a memory address argument of the memory examining system call; and wherein the method includes:

intercepting, by the switch task, such a memory examining system call executed in step (vi), wherein the setting of the debug task variable by the switch task in step (vi) is in response to the argument of the memory examining system call.

10. An apparatus comprising:

a processor, a storage device connected to the processor, wherein the storage device has stored thereon instructions for controlling the processor to debug multiple tasks using a single instance of a debugger application intended to be only capable of debugging a single task, wherein the instructions on the storage device include:

first instructions for executing only a single instance of a debugger application under an operating system on the computer system, wherein the computer system includes memory and the memory includes registers;

second instructions for executing first and second target tasks, wherein executing the debugger application includes executing system calls to services of the operating system; and third instructions for executing a switch task, the third instructions including:

fourth instructions for intercepting the system calls by the switch task;

fifth instructions for setting a debug task variable by the switch task in response to one of the target tasks encountering a breakpoint, wherein the debug task variable indicates the one of the target tasks that encountered the breakpoint, and wherein in response to a first user-initiated register display command after the breakpoint the switch task directs a first set of register contents to the debugger application for displaying to the user, the first set of register contents being for the one of the target tasks indicated by the debug task variable;

sixth instructions for setting, by the switch task, the debug task variable, to indicate a certain one of the target tasks in response to a command issued by a user of the debugger application for switching to the certain one of the target tasks;

seventh instructions for signaling a false breakpoint to the debugger application by the switch task in response to the command issued by the user of the debugger application for switching to the certain one of the target tasks, so that the debugger application generates a command prompt for the user; and eighth instructions for directing, by the switch task, a second set of register contents to the debugger application for displaying to the user, the directing of the second set of register contents to the debugger application being in response to a second user-initiated register display command arising from the seventh instructions, and in response to the setting of the debug task variable arising from the sixth instructions, so that the second provided set of register contents is for the one of the target tasks indicated by the debug task variable arising from the sixth instructions.

11. The apparatus of claim 10, wherein the command issued by the user for switching to the certain one of the target tasks and to which the switch task responsively signals a breakpoint includes a certain memory examining system call;

wherein the operating system examines contents of the memory at a specified address in response to the memory examining system call, the memory address being specified by a memory address argument of the memory examining system call;

and wherein the instructions on the storage device include:

instructions for intercepting, by the switch task, such a memory examining system call, wherein the fifth instructions include instructions for setting the debug task variable by the switch task in response to the argument of the memory examining system call.

12. Computer software, recorded on a medium and capable of execution by computing means able to interpret the computer software, for debugging multiple tasks using a single instance of a debugger application intended to be only capable of debugging a single task, the computer software comprising:

first software code means for executing only a single instance of a debugger application under an operating system on the computer system, wherein the computer system includes memory and memory includes registers;

second software code means for executing first and second target tasks, wherein executing the debugger application includes executing system calls to services of the operating system; and third software code means for executing a switch task, the third software code means including:

fourth software code means for intercepting the system calls by the switch task;

fifth software code means for setting a debug task variable by the switch task in response to one of the target tasks encountering a breakpoint, wherein the debug task variable indicates the one of the target tasks that encountered the breakpoint, and wherein in response to a first user-initiated register display command after the breakpoint the switch task directs a first set of register contents to the debugger application for displaying to the user, the first set of register contents being for the one of the target tasks indicated by the debug task variable;

sixth software code means for setting, by the switch task, the debug task variable, to indicate a certain one of the target tasks in response to a command issued by a user of the debugger application for switching to the certain one of the target tasks;

seventh software code means for signaling a false breakpoint to the debugger application by the switch task in response to the command issued by the user of the debugger application for switching to the certain one of the target tasks, so that the debugger application generates a command prompt for the user; and eighth software code means for directing, by the switch task, a second set of register contents to the debugger application for displaying to the user, the directing of the second set of register contents to the debugger application being in response to a second user-initiated register display command arising from the seventh software code means, and in response to the setting of the debug task variable arising from sixth software code means, so that the second provided set of register contents is for the one of the target tasks indicated by the debug task variable arising front sixth software code means.

13. The computer software of claim 12, wherein the command issued by the user for switching to the certain one of the target tasks and to which the switch task responsively signals a breakpoint includes a certain memory examining system call;

wherein the operating system examines contents of the memory at a specified address in response to the memory examining system call, the memory address being specified by a memory address argument of the memory examining system call; and wherein the computer software includes:

software code means for intercepting, by the switch task, such a memory examining system call, wherein the fifth software code means includes instructions for setting the debug task variable by the switch task in response to the argument of the memory examining system call.

* * * * *

UNITED STATES PATENT AND TRADEMARK OFFICE
CERTIFICATE OF CORRECTION

PATENT NO. : 6,988,264 B2
DATED : January 17, 2006
INVENTOR(S) : Dipankar Sarma and Srivatsa Vaddagiri It is certified that error appears in the above-identified patent and that said Letters Patent is hereby corrected as shown below:

<u>Column 15,</u>
Line 9, reads "(i) executing only single instance of a debugger…"
should read -- (i) executing only a single instance of a debugger --.

Signed and Sealed this

Second Day of May, 2006

JON W. DUDAS
*Director of the United States Patent and Trademark Office*